United States Patent
Goto et al.

(10) Patent No.: US 11,101,627 B2
(45) Date of Patent: Aug. 24, 2021

(54) ELECTRICAL CONNECTION BOX AND WIRE HARNESS

(71) Applicant: Yazaki Corporation, Tokyo (JP)

(72) Inventors: Hiroki Goto, Shizuoka (JP); Akinori Nakashima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/843,887

(22) Filed: Apr. 9, 2020

(65) Prior Publication Data

US 2020/0358274 A1    Nov. 12, 2020

(30) Foreign Application Priority Data

May 9, 2019    (JP) .............................. JP2019-088931

(51) Int. Cl.
*H02G 3/16* (2006.01)
*B60R 16/023* (2006.01)
*H02G 3/08* (2006.01)

(52) U.S. Cl.
CPC ........... *H02G 3/16* (2013.01); *B60R 16/0238* (2013.01); *H02G 3/085* (2013.01)

(58) Field of Classification Search
CPC .......... H02G 3/08; H02G 3/086; H02G 3/081; H02G 3/16; B60R 16/0238; B60R 16/0239; B60R 16/0207; B60R 16/0215
See application file for complete search history.

(56) References Cited

U.S. PATENT DOCUMENTS

2016/0351368 A1    12/2016  Ikeda et al.
2017/0201079 A1*    7/2017  Shiraki ............... B60R 16/0238

FOREIGN PATENT DOCUMENTS

JP          2016-226139 A    12/2016

* cited by examiner

*Primary Examiner* — Hoa C Nguyen
*Assistant Examiner* — Amol H Patel
(74) *Attorney, Agent, or Firm* — Kenealy Vaidya LLP (57) ABSTRACT

An electrical connection box includes a block that houses a plurality of electronic components, a housing body in which an internal space for housing the block is formed, and engagement portions that are provided between the block and the housing body and fits the block to the housing body. The engagement portions include a first engagement portion corresponding to the one direction end of the block in a specific direction and a second engagement portion corresponding to the other direction end of the block in the specific direction. In the first engagement portion, an inclined surface of the guide receiving portion is formed. When the block is inserted into the housing body in the insertion direction, the inclined surface is formed by cutting out an end where the guide receiving portion faces a guide piece in the insertion direction.

3 Claims, 8 Drawing Sheets

ELECTRICAL CONNECTION BOX AND WIRE HARNESS

CROSS-REFERENCE TO RELATED APPLICATION(S)

The present application claims priority to and incorporates by reference the entire contents of Japanese Patent Application No. 2019-088931 filed in Japan on May 9, 2019.

BACKGROUND OF THE INVENTION

1. Field of the Invention

The present invention relates to an electrical connection box and a wire harness.

2. Description of the Related Art

An electrical connection box used for a wire harness mounted on a vehicle such as an automobile includes a plurality of electronic components housed in a housing space of a housing. Since the electronic components housed in the housing space are of various types and in large numbers, the electronic components are housed in the housing space of the housing in a preliminarily housed state in a block in which a plurality of cavities for housing the electronic components to which electric wires are connected is formed (see Japanese Patent Application Laid-open No. 2016-226139). A plurality of engagement portions is provided between the housing and the block, and the block is fitted to the housing by the engagement portions.

Incidentally, it is desirable that the block is inserted into the housing along a preset insertion direction, e.g., a perpendicular direction, in order to unfailingly engage the engagement portions. A worker inserts the block into the housing manually. Depending on the shape of the block, the density of the electronic components housed in the block, or the like, the gripping position of the worker with respect to the block that houses the electronic components to which the electric wires are connected varies. For example, in cases where the worker's gripping position is a biased position of the block, when the worker inserts the block into the housing, the engagement portion closer to the gripping position is engaged earlier than the engagement portion that is farther from the gripping position. Thus, there is a possibility that the insertion direction of the block may be inclined with respect to the preset insertion direction. Therefore, there is a problem that the engagement portion that is farther from the gripping position is more difficult to engage than the engagement portion that is closer to the gripping position.

SUMMARY OF THE INVENTION

It is an object of the present invention to provide an electrical connection box and a wire harness capable of unfailingly performing engagement of engagement portions even when the insertion direction is different from a preset insertion direction when the block is inserted into the housing.

In order to achieve the above mentioned object, an electrical connection box according to one aspect of the present invention includes a block that forms a plurality of cavities for housing electronic components; a housing that forms a housing space for housing the block; and at least a plurality of engagement portions configured to be provided between the block and the housing, the plurality of engagement portions fitting the block to the housing in a housing state in which the block is housed in the housing in an insertion direction, wherein the plurality of engagement portions includes one or more first engagement portions corresponding to a one direction end of the block in a specific direction and one or more second engagement portions corresponding to an other direction end of the block in the specific direction, the first engagement portion and the second engagement portion include an engagement piece formed on one of the block and the housing, an engagement receiving portion that is formed on the other and engages with the engagement piece when the block is inserted into the housing in the insertion direction, a guide piece formed on one of the block and the housing, and a guide receiving portion that is formed on the other and starts guidance of the guide piece in the insertion direction before the engagement piece contacts the engagement receiving portion when the block is inserted into the housing in the insertion direction, on at least one engagement portion of the first engagement portion and the second engagement portion, an inclined surface is formed on at least one of the guide piece and the guide receiving portion, and the inclined surface is formed by cutting out an end where the guide piece and the guide receiving portion face each other in the insertion direction when the block is inserted into the housing in the insertion direction.

According to another aspect of the present invention, in the electrical connection box, it is possible to configure that the block has a longitudinal direction, and the specific direction is the longitudinal direction.

According to still another aspect of the present invention, in the electrical connection box, it is possible to configure that the block includes an electronic component sparse region in which the accommodated electronic components are sparse and an electronic component dense region in which the accommodated electronic components are dense in the specific direction, the first engagement portion is formed on the electronic component sparse region side, the second engagement portion is formed on the electronic component dense region side, and the inclined surface is formed on at least one of the guide piece and the guide receiving portion of at least the first engagement portion.

In order to achieve the above mentioned object, a wire harness according to still another aspect of the present invention includes an electrical connection box including a block that forms a plurality of cavities for housing an electronic components, a housing that forms a housing space for housing the block, and at least a plurality of engagement portions configured to be provided between the block and the housing, the plurality of engagement portions fitting the block to the housing in a housing state in which the block is housed in the housing in an insertion direction; and an electric wire electrically connected to the electronic component, wherein the plurality of engagement portions includes one or more first engagement portions corresponding to one direction end of the block in a specific direction, and one or more second engagement portions corresponding to an other direction end of the block in a specific direction, the first engagement portion and the second engagement portion include an engagement piece formed on one of the block and the housing, an engagement receiving portion that is formed on the other and engages with the engagement piece when the block is inserted into the housing in the insertion direction, a guide piece formed on one of the block and the housing, and a guide receiving portion that is formed on the other and starts guidance of the guide piece in the insertion direction before the engagement piece contacts the engagement receiving portion when the block is inserted into the housing in the insertion direction, on at least one engagement portion of the first engagement portion and the second engagement portion, an inclined surface is formed on at least one of the guide piece and the guide receiving portion, and the inclined surface is formed by cutting out an end where the guide piece and the guide receiving portion face each other in the insertion direction when the block is inserted into the housing in the insertion direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an electrical connection box and a wire harness according to the present invention will be described below in detail on the basis of the drawings. In addition, this invention is not limited by this embodiment.

In addition, constituent elements of the embodiment described below include those that can be easily conceived by those skilled in the art or those that are substantially the same. In addition, constituent elements of the embodiment described below can be variously omitted, replaced, and changed without departing from the spirit of the invention.

Embodiment

Figure 1:
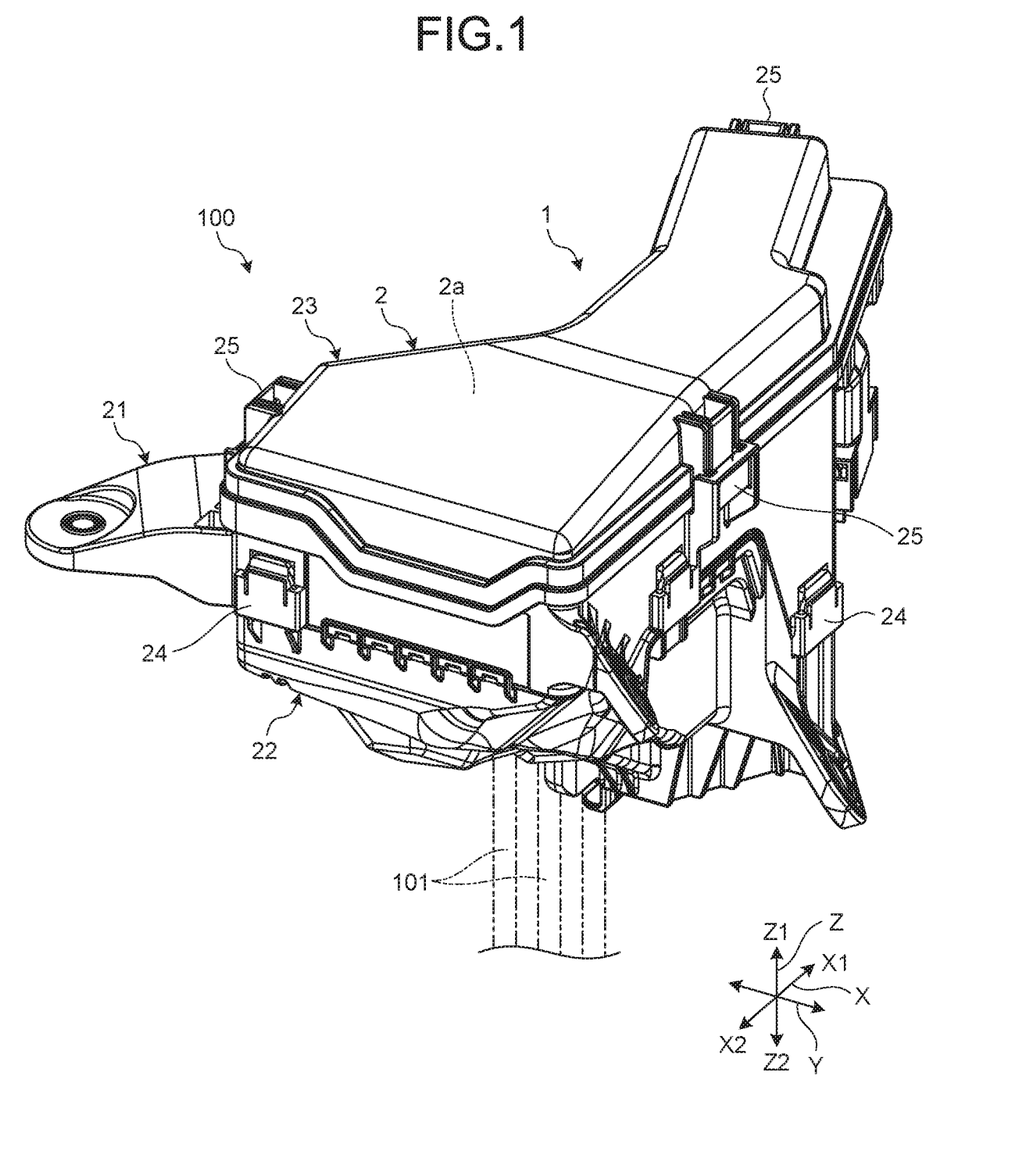
FIG. 1 is a perspective view illustrating an electrical connection box according to an embodiment.
Figure 2:
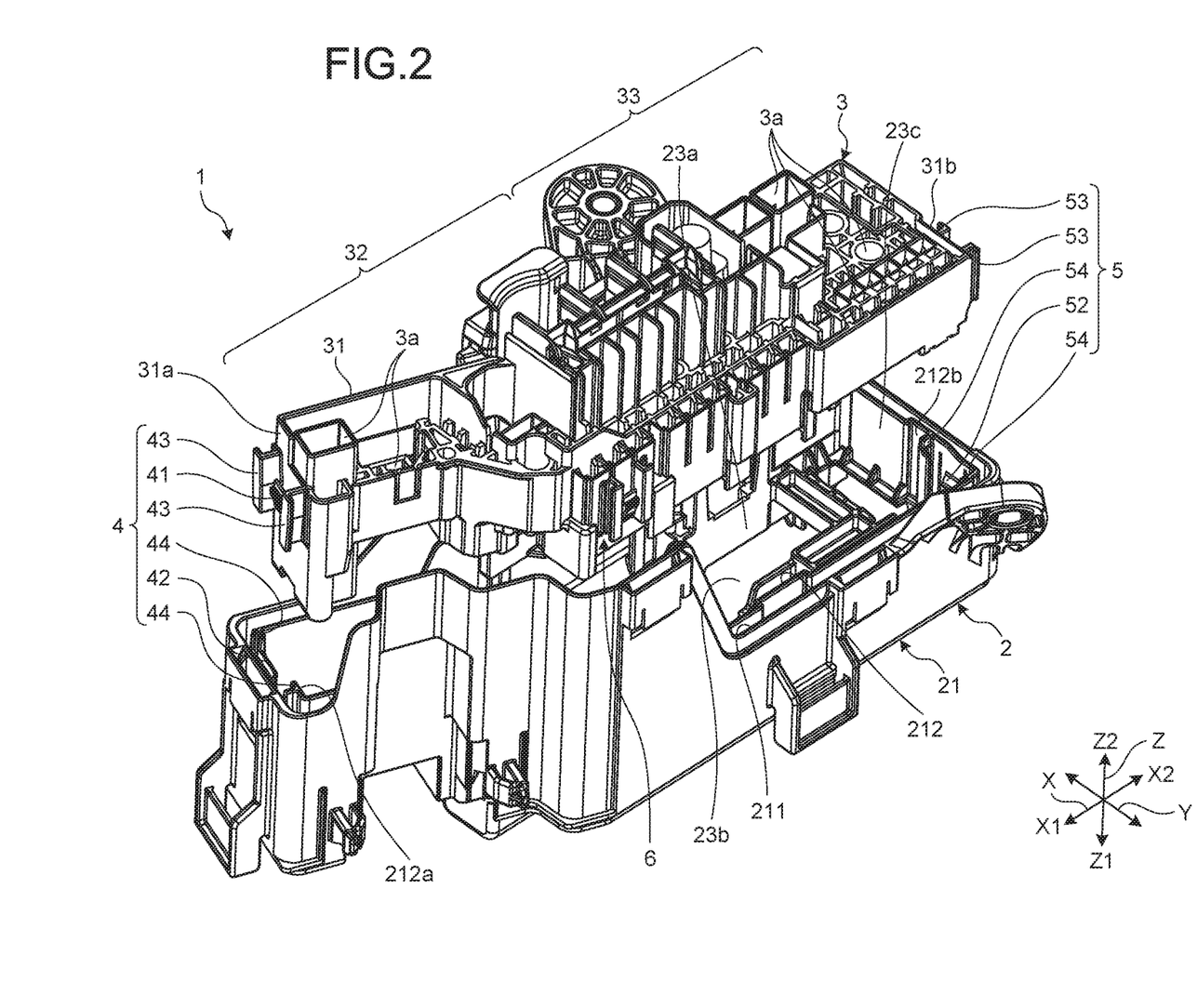
FIG. 2 is a partially exploded perspective view of the electrical connection box according to the embodiment.
Figure 3:
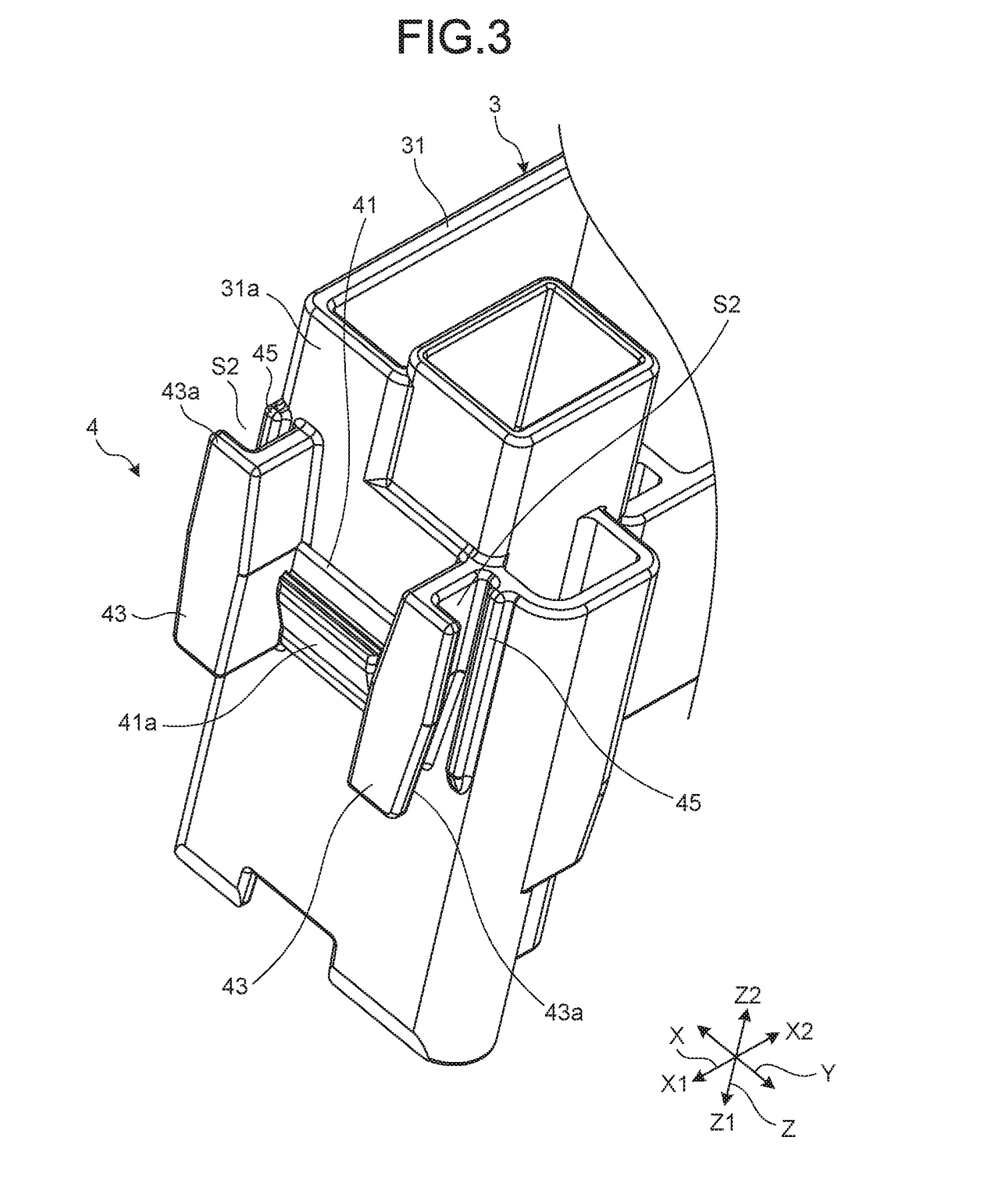
FIG. 3 is a perspective view illustrating an engagement piece and a guide piece of a first engagement portion.
Figure 4:
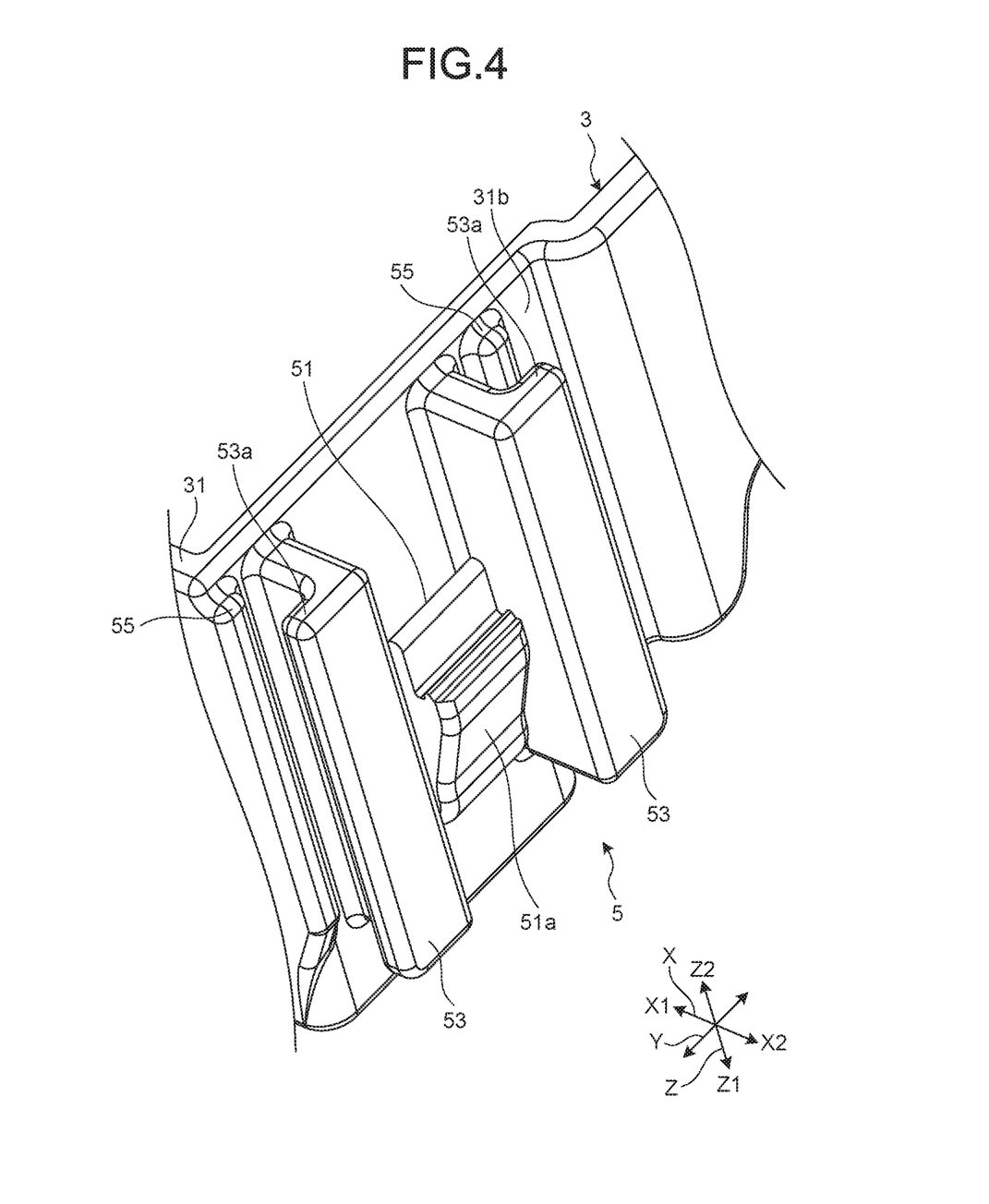
FIG. 4 is a perspective view illustrating an engagement piece and a guide piece of a second engagement portion.
Figure 5:
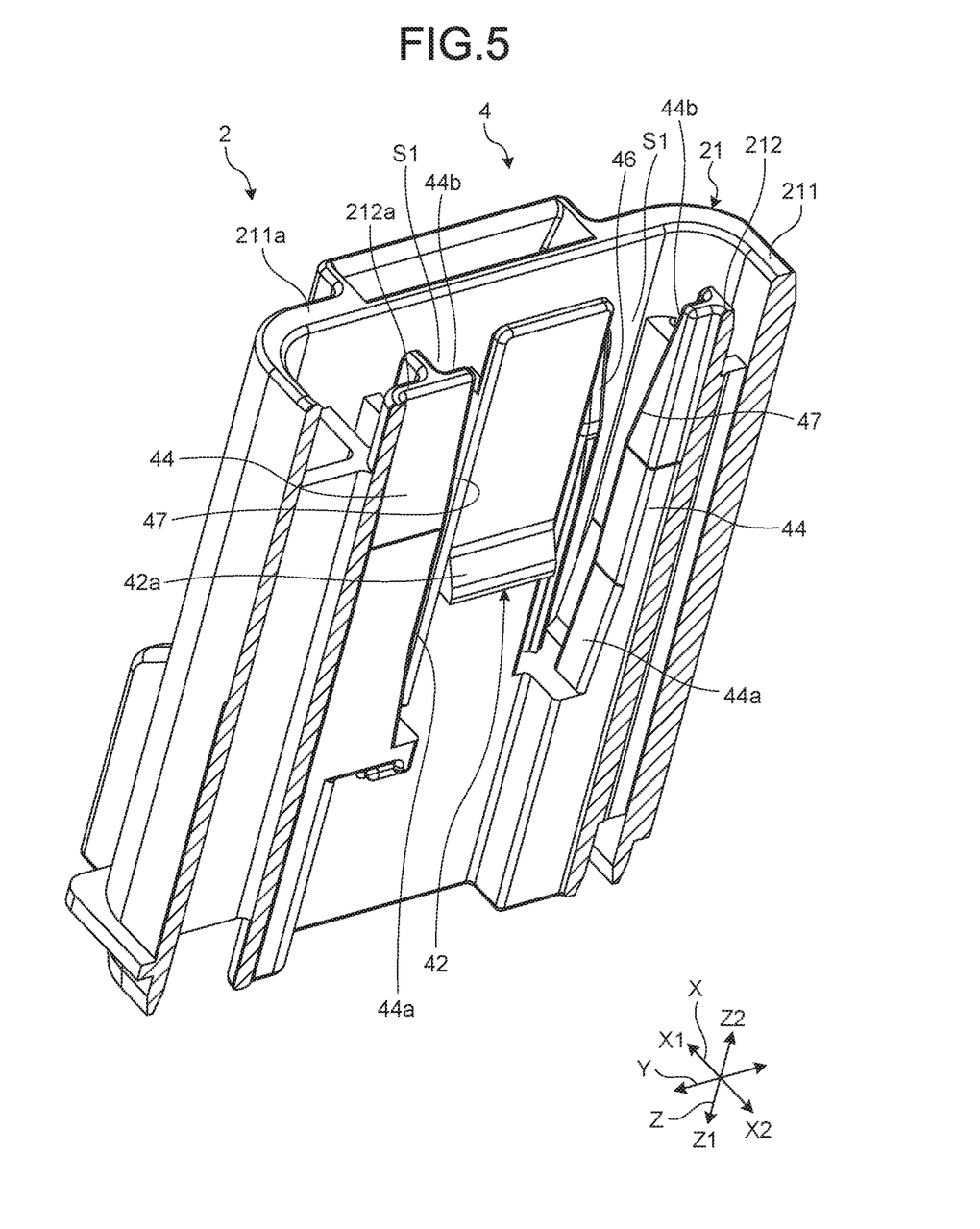
FIG. 5 is a perspective view illustrating an engagement receiving portion and a guide receiving portion of the first engagement portion.
Figure 6:
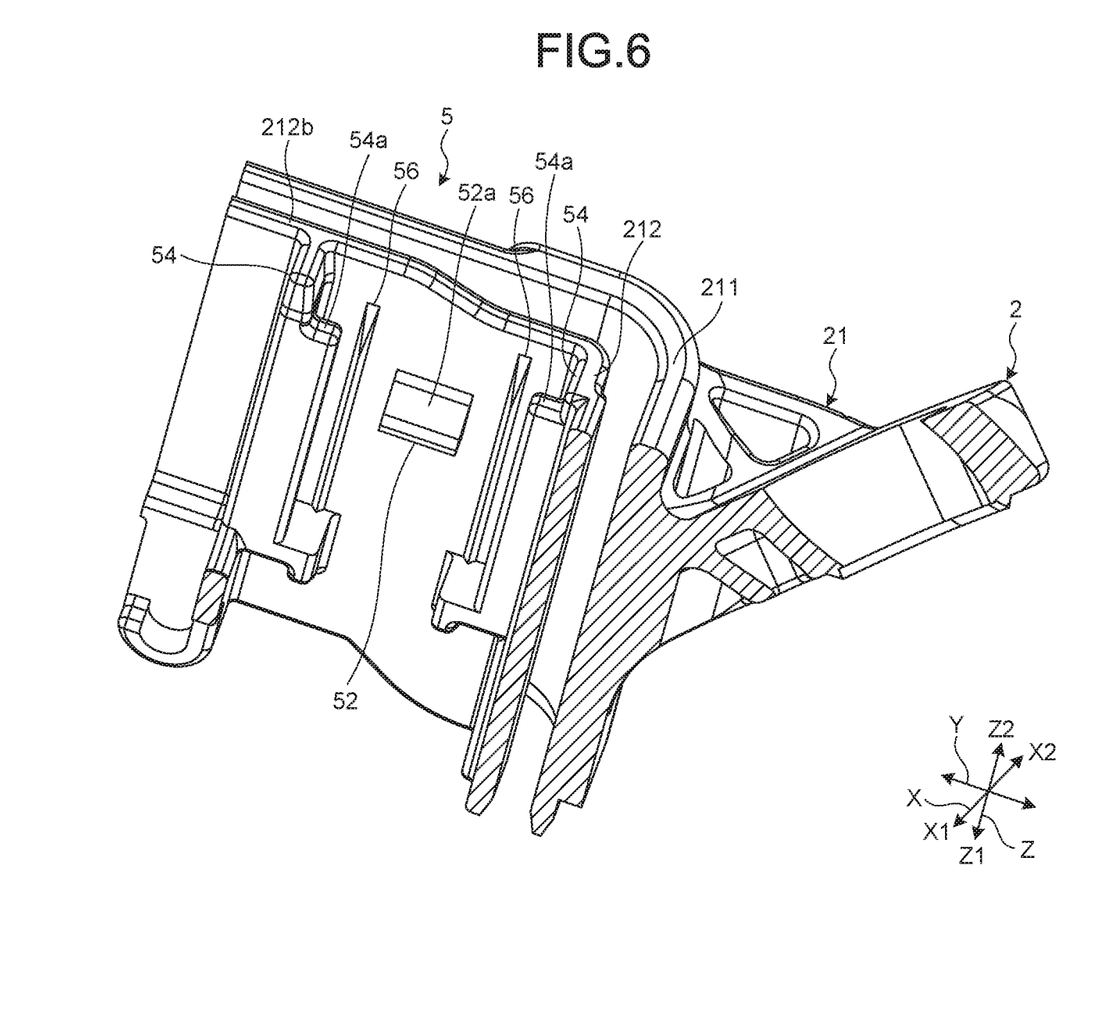
FIG. 6 is a perspective view illustrating an engagement receiving portion and a guide receiving portion of the second engagement portion.
Figure 7:
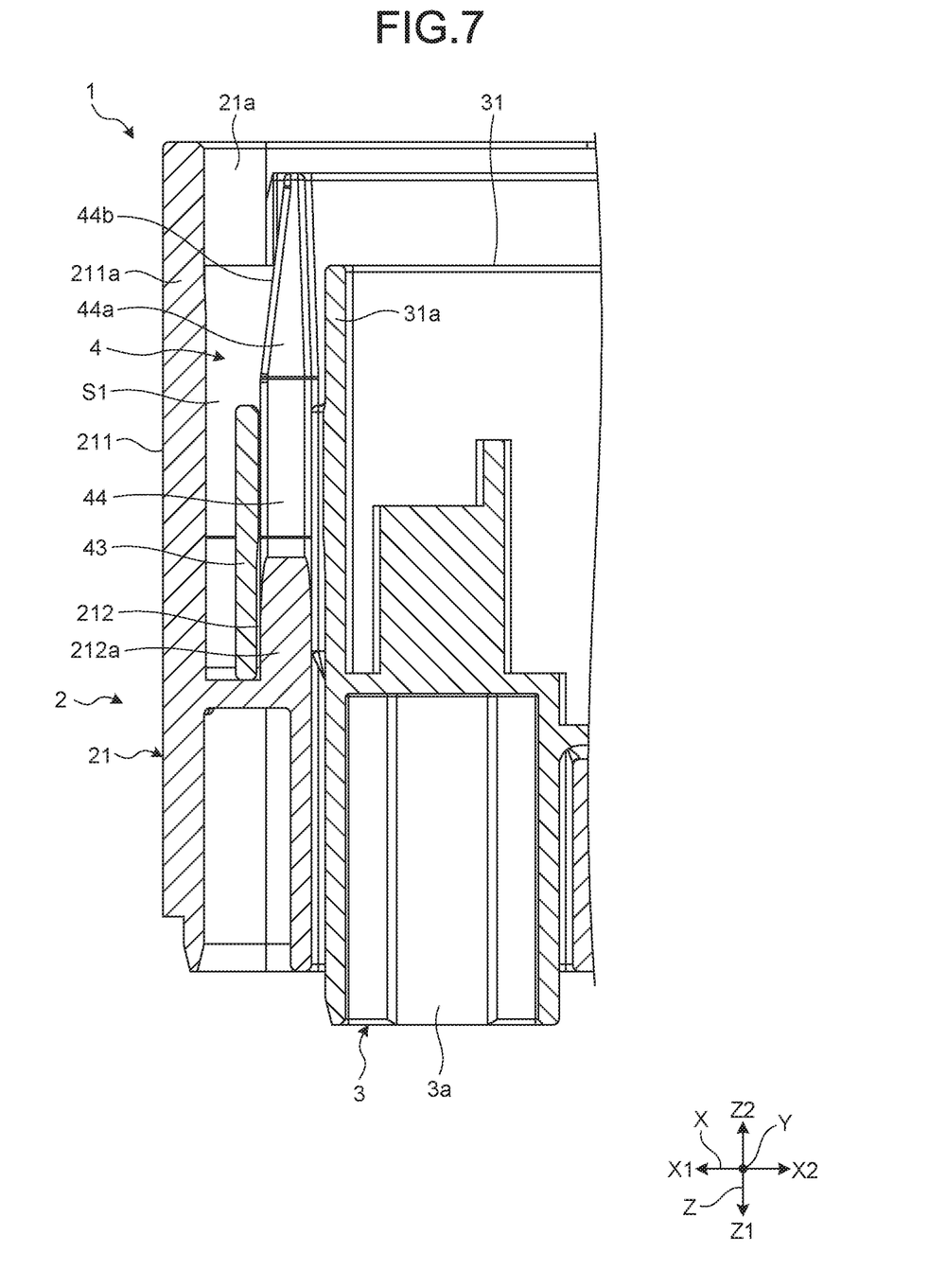
FIG. 7 is a cross-sectional view illustrating an engagement state of the first engagement portion.
Figure 8:
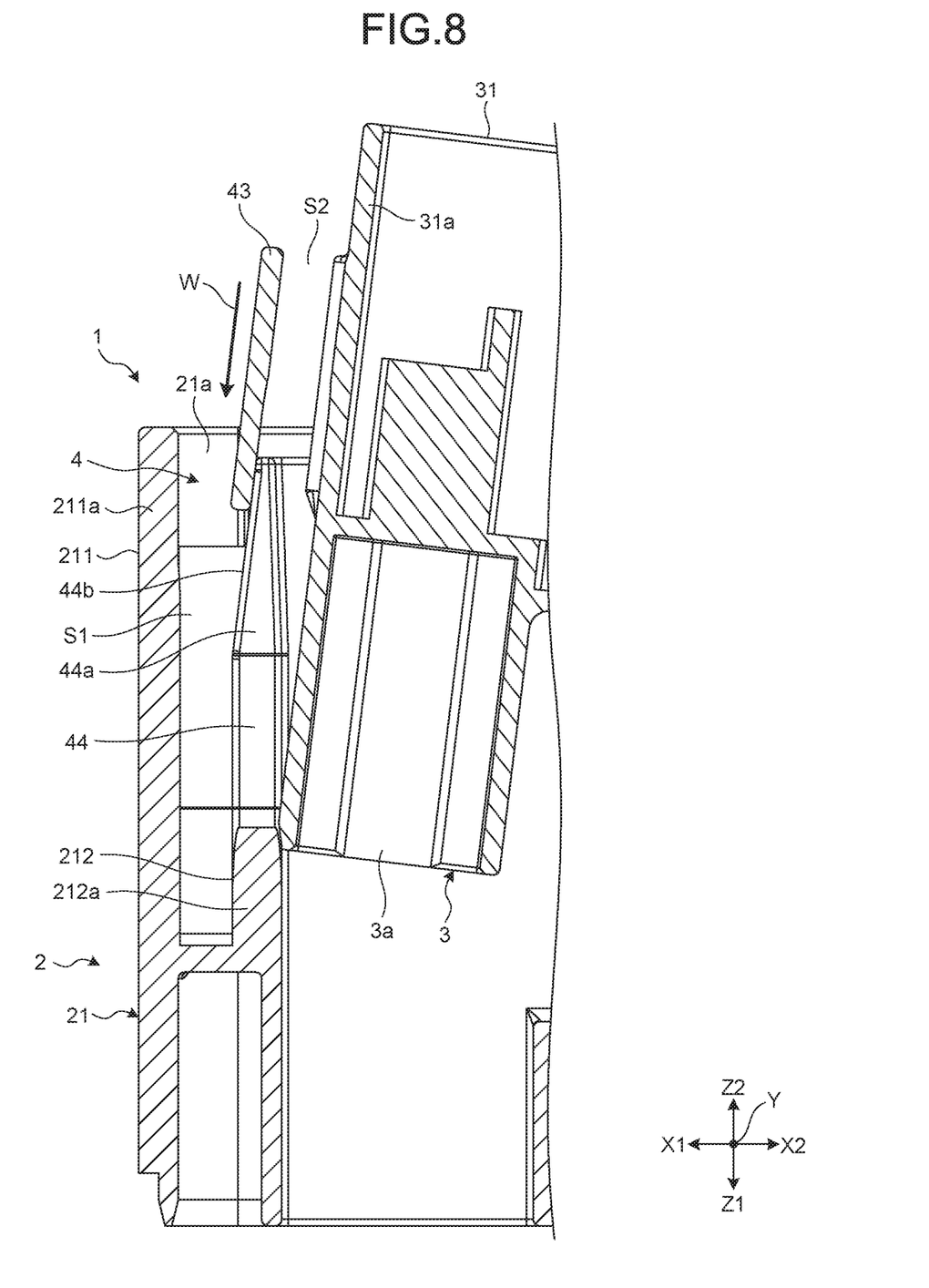
FIG. 8 is a cross-sectional view illustrating a state where a block is inserted into a housing body.

First, an electrical connection box and a wire harness according to an embodiment will be described. FIG. 1 is a perspective view illustrating an electrical connection box according to an embodiment. FIG. 2 is a partially exploded perspective view of the electrical connection box according to the embodiment. FIG. 3 is a perspective view illustrating an engagement piece and a guide piece of a first engagement portion. FIG. 4 is a perspective view illustrating an engagement piece and a guide piece of a second engagement portion. FIG. 5 is a perspective view illustrating an engagement receiving portion and a guide receiving portion of the first engagement portion. FIG. 6 is a perspective view illustrating an engagement receiving portion and a guide receiving portion of the second engagement portion. FIG. 7 is a cross-sectional view illustrating an engagement state of the first engagement portion. FIG. 8 is a cross-sectional view illustrating a state where a block is inserted into a housing. Here, FIG. 2 is a perspective view of the housing body and the block, and FIGS. 7 and 8 are cross-sectional views including the guide piece and the guide receiving portion of the first engagement portion. Here, the X direction in the drawings is the width direction of the electrical connection box in the present embodiment, and is a specific direction. The Y direction is a depth direction of the electrical connection box in the present embodiment. The Z direction is an up-and-down direction in the present embodiment. Also, the X1 direction is one direction of the width direction, the X2 direction is the other direction of the width direction, the Z1 direction is the upward direction of the up-and-down direction, which is the preset insertion direction, and the Z2 direction is the downward direction of the up-and-down direction, which is a removal direction.

An electrical connection box 1 according to the present embodiment is mounted on a vehicle such as an automobile and distributes electric power supplied from a power source such as a battery to various electronic devices mounted on the vehicle via various electronic components and the like. Here, as illustrated in FIG. 1, the electrical connection box 1 is incorporated in a wire harness 100, and electronic components such as a connector, a fuse, a relay, a branch unit, and an electronic controller that constitute connection processing components such as an electric wire 101 are collected and housed inside. The electrical connection box 1 in the present embodiment is installed in a space inside the vehicle such as an engine room, a trunk room, and a room of the vehicle, and is connected between a power source such as a battery and various electronic devices mounted in the vehicle. Note that the electrical connection box 1 may be called a junction box, a fuse box, a relay box, or the like, but these are collectively referred to as the electrical connection box 1 in the present embodiment. In addition, the electrical connection box 1 in the present embodiment is installed in the vehicle interior space so that the up-and-down direction matches the vertical direction. As illustrated in FIGS. 1 and 2, the electrical connection box 1 includes a housing 2 including a plurality of housing components, a block 3, a first engagement portion 4, and a second engagement portion 5, and another engagement portion 6.

As illustrated in FIGS. 1 and 2, the housing 2 is made of an insulating synthetic resin, and houses a plurality of electronic components, which is not illustrated, in a housing space 2a formed therein. The housing 2 in the present embodiment houses the plurality of electronic components by housing the block 3 that houses the plurality of electronic components in the housing space 2a. Here, the electronic component is a bus bar, a relay, a fuse, a fusible link, or the like. At least a part of the electronic component is connected to the electric wire 101 inserted into the housing space 2a through an insertion hole, which is not illustrated. The housing 2 has a housing body 21, a lower cover 22, and an upper cover 23. The housing 2 has a structure in which a plurality of layers (three layers) is stacked in the order of the lower cover 22, the housing body 21, and the upper cover 23 in the insertion direction, i.e., a structure in which the housing 2 is divided into a plurality of housing components. Here, the housing space 2a of the housing 2 includes an internal space 21a of the housing body 21, an internal space, which is not illustrated, of the lower cover 22, and an internal space, which is not illustrated, of the upper cover 23.

As illustrated in FIGS. 2, 5, and 6, the housing body 21 houses the block 3 in the internal space 21a. The housing body 21 has an outer peripheral wall 211 constituting an outer periphery, and an inner peripheral wall 212 formed along the outer peripheral wall 211 on the inner side of the outer peripheral wall 211, i.e., on the internal space 21a side. The housing body 21 in the present embodiment is formed in a substantially rectangular shape having a specific direction in the width direction, i.e., a longitudinal direction, when viewed in the up-and-down direction. Here, the longitudinal direction of the housing body 21 is the width direction of the electrical connection box 1, i.e., the specific direction. The housing body 21 has an upper opening 23b and a lower opening 23c at both ends in the up-and-down direction. The internal space 21a is formed of the inner peripheral wall 212, and communicates with the internal space of the lower cover 22 and the internal space of the upper cover 23 by the upper opening 23b and the lower opening 23c in the up-and-down direction, respectively. The housing body 21 has a part of the first engagement portion 4 formed at the one direction end in the width direction. In the housing body 21 in the present embodiment, an engagement receiving portion 42 and a guide receiving portion 44, which will be described later, are formed at the one direction end 212a of the inner peripheral wall 212 in the width direction. The housing body 21 has a part of the second engagement portion 5 formed at the other direction end in the width direction. In the housing body 21 in the present embodiment, an engagement receiving portion 52 and a guide receiving portion 54, which will be described later, are formed at the other direction end 212b of the inner peripheral wall 212 in the width direction.

The lower cover 22 is a dish-shaped member and closes the lower opening 23c of the housing body 21. The lower cover 22 has an opening, which is not illustrated, formed at the upward direction end, and an insertion hole formed with the housing body 21 at the downward direction end. The lower cover 22 is detachably engaged with the housing body 21 at the downward direction end of the housing body 21 by the plurality of engagement portions 24.

The upper cover 23 is a dish-shaped member and closes the upper opening 23b of the housing body 21. The upper cover 23 has an opening, which is not illustrated, formed at the downward direction end. The upper cover 23 is detachably engaged with the housing body 21 at the upward direction end of the housing body 21 by a plurality of engagement portions 25.

As illustrated in FIGS. 2, 3, and 4, the block 3 is made of an insulating synthetic resin, and houses one or more electronic components in each of a plurality of cavities 3a formed therein. The block 3 has a block peripheral wall 31 constituting an outer periphery. The block 3 in the present embodiment is formed in a substantially rectangular shape having a specific direction in the width direction, i.e., a longitudinal direction, when viewed in the up-and-down direction. Here, the longitudinal direction of the block 3 is the width direction of the electrical connection box 1, i.e., the specific direction. The cavities 3a communicate with the internal space of the lower cover 22 through at least the lower opening into which the electronic component is inserted. The block 3 has a part of the first engagement portion 4 formed at the one direction end in the width direction. In the block 3 in the present embodiment, an engagement piece 41 and a guide piece 43, which will be described later, are formed at the one direction end 31a of the block peripheral wall 31 in the width direction. The block 3 has a part of the second engagement portion 5 formed at the other direction end in the width direction. In the block 3 in the present embodiment, an engagement piece 51 and a guide piece 53, which will be described later, are formed at the other direction end 31b of the block peripheral wall 31 in the width direction. Here, in the block 3, the number of cavities 3a formed in the width direction, i.e., the specific direction, varies. In the block 3 in the present embodiment, the number of cavities 3a at the other direction end is larger than the number of cavities 3a at the one direction end in the width direction. That is, in the block 3, more number of electronic components is accommodated in the cavity forming region on the second engagement portion 5 side than in the cavity forming region on the first engagement portion 4 side in the width direction. Therefore, the block 3 has an electronic component sparse region 32 in which the accommodated electronic components are sparse and an electronic component dense region 33 in which the accommodated electronic components are dense in the width direction. That is, in the block 3, the number of electric wires 101 is larger in the electronic component dense region 33 than in the electronic component sparse region 32.

The first engagement portion 4, the second engagement portion 5, and the another engagement portion 6 are, as illustrated in FIGS. 2 to 7, engagement portions that are provided between the block 3 and the housing 2. Each of the engagement portions 4, 5, and 6 is to fit the block 3 to the housing body 21 in a housing state where the block 3 is housed in the housing body 21 of the housing 2 in the insertion direction. In the present embodiment, the first engagement portion 4 and the second engagement portion 5 are provided at both ends in the width direction, and the another engagement portion 6 is provided at at least the one direction end in the depth direction that is perpendicular to the width direction. The first engagement portion 4, the second engagement portion 5, and the another engagement portion 6 are engaged to restrict the movement of the block 3 with respect to the housing 2 in the removal direction.

As illustrated in FIGS. 2, 3, 5, and 7, the first engagement portion 4 corresponds to the one direction end in the width direction and is formed at the one direction end in the width direction in the space formed between the block 3 and the housing 2. The first engagement portion 4 in the present embodiment is formed on the electronic component sparse region 32 side. The first engagement portion 4 includes the engagement piece 41, the engagement receiving portion 42, the guide piece 43, the guide receiving portion 44, a protrusion 45, and a protrusion 46.

As illustrated in FIG. 3, the engagement piece 41 is formed to protrude in the one direction at the one direction end 31a of the block peripheral wall 31. The engagement piece 41 has an insertion direction end fixed to the one direction end 31a and supported to be resiliently deformable in the other direction with respect to the one direction end 31a. The engagement piece 41 has a guide surface 41a that is inclined in the one direction toward the removal direction.

As illustrated in FIG. 5, the engagement receiving portion 42 engages with the engagement piece 41 when the block 3 is inserted into the housing body 21 in the insertion direction. The engagement receiving portion 42 is formed at the one direction end 212a of the inner peripheral wall 212 to protrude in the other direction. The engagement receiving portion 42 has a guide surface 42a that is inclined in the other direction toward the insertion direction. The engagement piece 41 and the engagement receiving portion 42 face each other in the up-and-down direction in the housing state where the block 3 is housed in the housing body 21 in the insertion direction, to restrict the movement of the block 3 with respect to the housing 2 in the removal direction.

As illustrated in FIG. 3, the guide pieces 43 are formed at a distance in pair in the depth direction across the engagement piece 41. The guide piece 43 is formed to extend in the insertion direction, and the removal direction end is formed closer to the removal direction side than the removal direction end of the engagement piece 41 is. The guide piece 43 protrudes from the one direction end 31a in the one direction when viewed in the insertion direction, and a tip 43a is formed to protrude toward the side opposite from the engagement piece 41 side in the depth direction. That is, the guide piece 43 is formed in an L-shape protruding from the one direction end 31a when viewed in the insertion direction.

As illustrated in FIG. 5, the guide receiving portion 44 starts guidance of the guide piece 43 in the insertion direction before the engagement piece 41 and the engagement receiving portion 42 come into contact with each other when the block 3 is inserted into the housing body 21 in the insertion direction. The guide receiving portions 44 are formed at a distance in pair in the depth direction across the engagement receiving portion 42. Here, cutouts 47 through which the guide pieces 43 are inserted are respectively formed between the engagement receiving portion 42 and the pair of guide receiving portions 44 when viewed in the width direction. The guide receiving portion 44 is formed to extend in the insertion direction, and the removal direction end is formed closer to the removal direction side than the removal direction end of the engagement receiving portion 42 is. When viewed in the insertion direction, the guide receiving portion 44 protrudes from the one direction end 212a toward the engagement receiving portion 42 side in the depth direction, and a tip 44a is formed in the one direction. That is, the guide receiving portion 44 is formed in an L-shape protruding from the one direction end 212a when viewed in the insertion direction. Before the engagement piece 41 and the engagement receiving portion 42 come into contact with each other, the insertion direction side end of the guide piece 43 is inserted into the removal direction side end of the guide receiving portion 44, and the guidance of the guide piece 43 in the insertion direction is started by the guide receiving portion 44. The guide receiving portion 44 has an inclined surface 44b. When the block 3 is inserted into the housing body 21 in the insertion direction, the inclined surface 44b is formed by cutting out the ends where the guide pieces 43 and the guide receiving portions 44 face each other in the insertion direction. The inclined surface 44b makes it easy for the insertion direction end of the guide piece 43 to be inserted into space S1 between the guide receiving portion 44 and the outer peripheral wall 211 when the block 3 is inserted into the housing body 21 in the insertion direction. The inclined surface 44b is formed on the surface of the guide receiving portion 44 that faces the guide piece 43 in the width direction. The inclined surface 44b in the present embodiment is formed by cutting out the removal direction end of the tip 44a of the guide receiving portion 44 that faces the guide piece 43 in the insertion direction. The inclined surface 44b is formed to be inclined in the one direction from the removal direction end toward the insertion direction. That is, the space S1 is formed to expand in the other direction toward the removal direction. The guide piece 43 and the guide receiving portion 44 face in the width direction and in the depth direction in the housing state where the block 3 is housed in the housing body 21 in the insertion direction, so as to restrict the movement of the block 3 with respect to the housing 2 in a horizontal plane perpendicular to the insertion direction.

As illustrated in FIG. 3, the protrusion 45 faces the tip 43a of the guide piece 43 in the width direction when viewed in the insertion direction, and is formed in pair corresponding to each guide piece 43. The protrusion 45 is formed on the one direction end 31a in the one direction. The protrusion 45 is formed to extend in the insertion direction.

As illustrated in FIG. 5, the protrusion 46 faces the tip 44a of the guide receiving portion 44 in the width direction when viewed in the insertion direction, and is formed in pair corresponding to each guide receiving portions 44. The protrusion 46 is formed on the one direction end 211a in the width direction of the outer peripheral wall 211 in the other direction. The protrusion 46 is formed to extend in the insertion direction.

As illustrated in FIGS. 2, 4, and 6, the second engagement portion 5 corresponds to the other direction end in the width direction, and is formed at the other direction end in the width direction in the space formed between the block 3 and the housing 2. The second engagement portion 5 in the present embodiment is formed on the electronic component dense region 33 side. The second engagement portion 5 includes the engagement piece 51, the engagement receiving portion 52, the guide piece 53, the guide receiving portion 54, a protrusion 55, and a protrusion 56.

As illustrated in FIG. 4, the engagement piece 51 is formed to protrude in the other direction at the other direction end 31b of the block peripheral wall 31. The engagement piece 51 has an insertion direction end fixed to the other direction end 31b and supported to be resiliently deformable in the one direction with respect to the other direction end 31b. The engagement piece 51 has a guide surface 51a that is inclined in the other direction toward the removal direction.

As illustrated in FIG. 6, the engagement receiving portion 52 engages with the engagement piece 51 when the block 3 is inserted into the housing body 21 in the insertion direction. The engagement receiving portion 52 is formed at the other direction end 212b of the inner peripheral wall 212 to protrude in the one direction. The engagement receiving portion 52 has a guide surface 52a that is inclined in the one direction toward the insertion direction. The engagement piece 51 and the engagement receiving portion 52 face each other in the up-and-down direction in the housing state where the block 3 is housed in the housing body 21 in the insertion direction to restrict the movement of the block 3 with respect to the housing 2 in the removal direction.

As illustrated in FIG. 4, the guide pieces 53 are formed at a distance in pair in the depth direction across the engagement piece 51. The guide piece 53 is formed to extend in the insertion direction, and the removal direction end is formed closer to the removal direction side than the removal direction end of the engagement piece 51 is. When viewed in the insertion direction, the guide piece 53 protrudes from the other direction end 31b in the other direction, and a tip 53a is formed to protrude in the depth direction on the side opposite to the engagement piece 51 side. That is, the guide piece 53 is formed in an L-shape protruding from the other direction end 31b when viewed in the insertion direction. Further, the guide piece 53 in the present embodiment is formed to be guided by the guide receiving portion 54 when the block 3 is inserted into the housing body 21 in the insertion direction before the guide piece 43 starts to be guided by the guide receiving portion 44. The insertion direction end of the guide piece 53 is formed closer to the insertion direction side than the insertion direction end of the guide piece 43 is.

As illustrated in FIG. 6, the guide receiving portion 54 starts guidance of the guide piece 53 in the insertion direction before the engagement piece 51 and the engagement receiving portion 52 come into contact with each other when the block 3 is inserted into the housing body 21 in the insertion direction. The guide receiving portions 54 are formed at a distance in pair in the depth direction across the engagement receiving portion 52. The guide receiving portion 54 is formed to extend in the insertion direction, and the removal direction end is formed closer to the removal direction side than the removal direction end of the engagement receiving portion 52 is. The guide receiving portion 54 is formed to protrude in the one direction from the other direction end 212b when viewed from the insertion direction, and a tip 54a is formed to protrude toward the engagement receiving portion 52 side in the depth direction. That is, the guide receiving portion 54 is formed in an L-shape protruding from the other direction end 212b when viewed in the insertion direction. Before the engagement piece 51 and the engagement receiving portion 52 come into contact with each other, the insertion direction side end of the guide piece 53 is inserted into the removal direction side end of the guide receiving portion 54, and the guidance of the guide piece 53 in the insertion direction is started by the guide receiving portion 54. The guide piece 53 and the guide receiving portion 54 face in the width direction and in the depth direction in the housing state where the block 3 is housed in the housing body 21 in the insertion direction so as to restrict the movement of the block 3 with respect to the housing 2 in a horizontal plane perpendicular to the insertion direction.

As illustrated in FIG. 4, the protrusion 55 faces the tip 53a of the guide piece 53 in the width direction when viewed in the insertion direction, and is formed in pair corresponding to each guide piece 53. The protrusion 55 is formed at the other direction end 31b in the other direction. The protrusion 55 is formed to extend in the insertion direction.

As illustrated in FIG. 6, the protrusion 56 faces the tip 54a of the guide receiving portion 54 in the width direction when viewed in the insertion direction, and is formed in pair corresponding to each guide receiving portions 54. The protrusion 56 is formed at the other direction end 212b of the inner peripheral wall 212 in the one direction. The protrusion 56 is formed to extend in the insertion direction.

Next, assembly of the electrical connection box 1 will be described. First, the worker houses an electronic component in each cavity 3a of the block 3. At this time, the worker electrically connects the electric wire 101 of the housed electronic components. That is, the block 3 is in a state where the electric wire 101 extends from the housed electronic components.

Next, as illustrated in FIG. 2, the worker arranges the block 3 to face the lower opening 23c of the housing body 21 in the up-and-down direction. At this time, in the block 3, the electronic component dense region 33 is heavier than the electronic component sparse region 32, and the center of gravity of the block 3 in the width direction is on the electronic component dense region 33 side, i.e., the second engagement portion 5 side. Therefore, in the block 3, the worker grips the electronic component dense region 33 side, i.e., the second engagement portion 5 side. Next, the worker inserts the block 3 into the housing body 21 in the insertion direction. At this time, the worker changes the gripping position from the block 3 to the electric wire 101 when the block 3 starts to be inserted into the housing body 21. Next, when the worker further inserts the block 3 into the housing body 21, the insertion direction end of the guide piece 53 is inserted into the space between the tip 54a of the guide receiving portion 54 and the other direction end 212b, and the guidance of the guide piece 53 in the insertion direction by the guide receiving portion 54 starts. Next, when the worker further inserts the block 3 into the housing body 21, the insertion direction end of the guide piece 43 is inserted into the space S1 between the tip 44a of the guide receiving portion 44 and the one direction end 211a, and the guidance of the guide piece 43 in the insertion direction by the guide receiving portion 44 starts. Next, when the worker further inserts the block 3 into the housing body 21, the guide surface 51a of the engagement piece 51 comes into contact with the guide surface 52a of the engagement receiving portion 52, and the engagement piece 51 resiliently deforms in the one direction. Thus, the engagement piece 51 gets over the engagement receiving portion 52, and the engagement piece 51 and the engagement receiving portion 52 face each other in the removal direction. At this time, the guide piece 53 maintains the state of being inserted into the space between the tip 54a and the other direction end 212b. Thus, the second engagement portion 5 is engaged. Next, when the worker further inserts the block 3 into the housing body 21, the guide surface 41a of the engagement piece 41 comes into contact with the guide surface 42a of the engagement receiving portion 42, and the engagement piece 41 resiliently deforms in the other direction. Thus, the engagement piece 41 gets over the engagement receiving portion 42, and the engagement piece 41 and the engagement receiving portion 42 face each other in the removal direction. At this time, the guide piece 43 maintains the state of being inserted into the space S1 between the tip 44a and the one direction end 211a. Thus, the first engagement portion 4 is engaged.

Next, the worker fits the lower cover 22 to the housing body 21 with the engagement portions 24. At this time, the worker exposes the electric wire 101 connected to the electronic components housed in the block 3 to the outside through the insertion hole formed by the housing body 21 and the lower cover 22.

Next, the worker fits the upper cover 23 to the housing body 21 with the engagement portions 25. Note that the electrical connection box 1 may be installed in the vehicle internal space after the upper cover 23 is attached or before the upper cover 23 is attached.

Here, when the worker inserts the block 3 into the housing body 21, as illustrated in FIG. 8, in some cases, the block 3 is inserted into the housing body 21, for example, in actual insertion direction W that is different from the preset insertion direction (Z1 direction), i.e., the preset direction for unfailing insertion of the block 3 into the housing body 21, and that crosses the preset insertion direction. The actual insertion direction W varies from worker to worker. In the electrical connection box 1 according to the present embodiment, because the worker sets the electronic component dense region 33 side as the gripping position, when viewed in the depth direction, the other direction end of the block 3 in the width direction becomes easy to be inserted into the housing body 21 earlier than the one direction end. In this case, the guide piece 53 is guided by the guide receiving portion 54 before the guide piece 43 is guided by the guide receiving portion 44. Therefore, when viewed in the depth direction, the block 3 is inserted into the housing body 21 while rotating in the insertion direction with the second engagement portion 5 as a base point. Therefore, the actual insertion direction W is a direction inclined in the one direction with respect to the preset insertion direction. When the inclined surface 44b is not formed on the first engagement portion 4, the insertion direction end of the guide piece 43 moves in the actual insertion direction W with respect to the guide receiving portion 44. Therefore, as a result of contact with the removal direction end of the guide receiving portion 44, the insertion operation of the block 3 into the housing body 21 is caught, and the guide piece 43 is not easily inserted into the space S1, and the removal direction end of the guide receiving portion 44 becomes difficult to be inserted into space S2 between the guide piece 43 and the one direction end 31a. On the other hand, in the electrical connection box 1 and the wire harness 100 according to the present embodiment, the inclined surface 44b is formed on the first engagement portion 4. Therefore, because the space S1 is formed by the inclined surface 44b so as to expand in the other direction toward the removal direction, when the block 3 is inserted into the housing body 21 in the insertion direction, even if the insertion direction end of the guide piece 43 moves in the actual insertion direction W with respect to the space S1, the guide piece 43 can be easily inserted into the space S1. That is, even if the insertion direction of the block 3 into the housing body 21 is the actual insertion direction W that is different from the preset insertion direction, the guide piece 43 can be unfailingly inserted into the guide receiving portion 44, and the engagement of the first engagement portion 4 can be unfailingly performed.

Further, in the electrical connection box 1 and the wire harness 100 in the present embodiment, the specific direction of the block 3 is set as the longitudinal direction, and the first engagement portion 4 is provided corresponding to one direction in the longitudinal direction. In cases where the block 3 is inserted into the housing body 21 in the insertion direction, when the longitudinal direction of the block 3 is an insertion direction that is different from the preset insertion direction, displacement in the width direction with respect to the housing body 21 is larger than displacement in the lateral direction. Therefore, by providing the first engagement portion 4 including the inclined surface 44b corresponding to the one direction in the longitudinal direction, even if the displacement of the block 3 in the width direction with respect to the housing body 21 is large when the block 3 is inserted into the housing body 21 in the insertion direction, because the guide piece 43 can be unfailingly inserted into the guide receiving portion 44 by the inclined surface 44b, the engagement of the first engagement portion 4 can be performed unfailingly.

Further, in the electrical connection box 1 and the wire harness 100 in the present embodiment, the first engagement portion 4 is formed not on the electronic component dense region 33 side, but on the electronic component sparse region 32 side in the specific direction. When the block 3 is inserted into the housing body 21 in the insertion direction, the electronic component dense region 33 side of the block 3 tends to be inserted earlier than the electronic component sparse region 32 side in the width direction, and thus the insertion direction tends to be different from the preset insertion direction. Therefore, by providing the first engagement portion 4 including the inclined surface 44b on the electronic component sparse region 32 side in the width direction, when the block 3 is inserted into the housing body 21 in the insertion direction, because the guide piece 43 can be unfailingly inserted into the guide receiving portion 44 by the inclined surface 44b, the engagement of the first engagement portion 4 can be performed unfailingly.

Note that although the inclined surface 44b in the present embodiment is formed on the guide receiving portion 44, the inclined surface 44b may be formed on only the guide piece 43 or on both the guide piece 43 and the guide receiving portion 44. When the inclined surface is formed on the guide piece 43, the inclined surface is formed by cutting out the insertion direction end of the guide piece 43. The inclined surface of the guide piece 43 is formed on the surface of the guide piece 43 that faces the guide receiving portion 44 in the width direction. The inclined surface of the guide piece 43 is formed to be inclined in the other direction from the insertion direction end toward the removal direction. That is, the space S2 is formed to expand in the one direction toward the insertion direction. In addition, the inclined surface 44b in the present embodiment is formed on the first engagement portion 4, but may also be formed on the second engagement portion 5.

Note that two or more first engagement portions 4 in the present embodiment may be formed corresponding to the one direction end of the block 3 in the width direction. Further, two or more second engagement portions 5 in the present embodiment may be formed corresponding to the other direction end of the block 3 in the width direction. Further, the positions where the engagement pieces 41 and 51, the engagement receiving portions 42 and 52, the guide pieces 43 and 53, and the guide receiving portions 44 and 54 are formed in the present embodiment may be interchanged.

An electrical connection box and a wire harness according to the present embodiment provide such an effect that, when a block is inserted into a housing, engagement of engagement portions can be unfailingly performed even when the block is inserted in an insertion direction that is different from a preset insertion direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An electrical connection box comprising:
a block that forms a plurality of cavities for housing electronic components;
a housing that forms a housing space for housing the block; and
at least a plurality of engagement portions configured to be provided between the block and the housing, the plurality of engagement portions fitting the block to the housing in a housing state in which the block is housed in the housing in an insertion direction, wherein
the plurality of engagement portions includes one or more first engagement portions corresponding to a one direction end of the block in a specific direction and one or more second engagement portions corresponding to an other direction end of the block in the specific direction,
the first engagement portion and the second engagement portion include
an engagement piece formed on one of the block and the housing,
an engagement receiving portion that is formed on the other and engages with the engagement piece when the block is inserted into the housing in the insertion direction,
a guide piece formed on one of the block and the housing, and
a guide receiving portion that is formed on the other and starts guidance of the guide piece in the insertion direction before the engagement piece contacts the engagement receiving portion when the block is inserted into the housing in the insertion direction, the block includes an electronic component sparse region in which the housed electronic components are sparse and an electronic component dense region in which the housed electronic components are dense in the specific direction, the first engagement portion is formed on a side of the electronic component sparse region, the second engagement portion is formed on a side of the electronic component dense region, and on at least the first engagement portion, an inclined surface is formed on at least one of the guide piece and the guide receiving portion, and the inclined surface is formed by cutting out an end where the guide piece and the guide receiving portion face each other in the insertion direction when the block is inserted into the housing in the insertion direction.

2. The electrical connection box according to claim 1, wherein the block has a longitudinal direction, and the specific direction is the longitudinal direction.

3. A wire harness comprising:

an electrical connection box including a block that forms a plurality of cavities for housing an electronic components, a housing that forms a housing space for housing the block, and at least a plurality of engagement portions configured to be provided between the block and the housing, the plurality of engagement portions fitting the block to the housing in a housing state in which the block is housed in the housing in an insertion direction; and an electric wire electrically connected to the electronic component, wherein the plurality of engagement portions includes one or more first engagement portions corresponding to one direction end of the block in a specific direction, and one or more second engagement portions corresponding to an other direction end of the block in a specific direction, the first engagement portion and the second engagement portion include an engagement piece formed on one of the block and the housing, an engagement receiving portion that is formed on the other and engages with the engagement piece when the block is inserted into the housing in the insertion direction, a guide piece formed on one of the block and the housing, and a guide receiving portion that is formed on the other and starts guidance of the guide piece in the insertion direction before the engagement piece contacts the engagement receiving portion when the block is inserted into the housing in the insertion direction, the block includes an electronic component sparse region in which the housed electronic components are sparse and an electronic component dense region in which the housed electronic components are dense in the specific direction, the first engagement portion is formed on a side of the electronic component sparse region, the second engagement portion is formed on a side of the electronic component dense region, and on at least the first engagement portion, an inclined surface is formed on at least one of the guide piece and the guide receiving portion, and the inclined surface is formed by cutting out an end where the guide piece and the guide receiving portion face each other in the insertion direction when the block is inserted into the housing in the insertion direction.

\* \* \* \* \*